Oct. 13, 1964  W. S. HANSEN  3,152,459
INTERLOCKING FLEXIBLE CASING
Filed Feb. 11, 1963

INVENTOR
Waldemar S. Hansen.

By A. G. Douvas.
ATTORNEY

United States Patent Office 3,152,459
Patented Oct. 13, 1964

3,152,459
INTERLOCKING FLEXIBLE CASING
Waldemar Schmidt Hansen, Cary, Ill., assignor to Stewart-Warner Corporation, Chicago, Ill., a corporation of Virginia
Filed Feb. 11, 1963, Ser. No. 257,441
10 Claims. (Cl. 64—3)

This invention relates to a flexible casing of a flexible shaft assembly. More particularly, this invention relates to a flexible casing, interlocking in nature, which can be freely bent or flexed in a plane through its longitudinal center axis only to some minimum radius of curvature and beyond which further bending is resisted by the strength of interlocking wire members of the casing.

A flexible shaft assembly commonly consists of a flexible core housed within a flexible outer protective casing. Core kinking and core extension are two major problems commonly experienced in the use of flexible shaft assemblies.

Core kinking commonly occurs during installation of the shaft assembly in the routing of the assembly around prohibitively sharp bends. Although the core is flexible in a plane through its longitudinal center axis, the flexibility is limited to bending to some minimum radius of curvature. Further bending to a smaller radius of curvature strains the fibers of the core beyond their elastic limit to cause a permanent kink in the core. The kink causes a whipping of the core in the causing to create excessive noise and possibly even fatigue failure of the core.

Similarly, the extension of the core from the casing must remain within the close tolerances regardless of the routing of the casing between its ends. Excessive core extension, or core retraction in the opposite sense, can cause increased fatigue wear or buckling of the core, excessive bearing load on the driving and the driven components, or total disengagement of the core from the components. In practice it is desirable to maintain the center axes of the core and casing substantially coincidental with one another, and to maintain the center axis arc lengths of the core and casing substantially equal for all bending or routing of the casing.

Accordingly, an object of this invention is to provide a flexible outer casing which can be flexed in a plane through its longitudinal center axis only to a given minimum radius of curvature, which radius of curvature is equal to or larger than the minimum permissive radius of curvature of the core supported therein, and beyond which any further bending of the casing is resistant by positive interlocking or binding of the wire members of the casing.

Another object of this invention is to provide a flexible outer casing which has little, if any, variation in its center line arc length upon transverse bending of the casing in a plane through its longitudinal center axis, so as to minimize or eliminate core extension therein.

Another object of this invention is to provide a flexible outer casing which can be economically fabricated and which is fluid-tight upon fabrication to prevent or minimize fluid leakage from the casing.

These and other objects will be more fully appreciated after a review of the specification including the drawing as a part thereof, in which.

Figure 1:
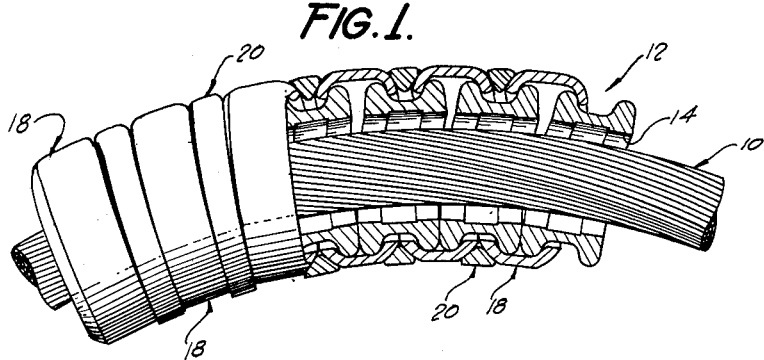
FIG. 1 is a view partly in longitudinal center section of a flexible shaft assembly including a flexible outer casing made in accordance with the principles of the subject invention.

FIG. 1 shows the cooperation of a typical flexible shaft assembly including a core 10 and a flexible casing 12 having an inner bore 14 within which the core 10 is received. The opposite ends of the core are keyed against rotation in any well known manner to the driving and driven components. The casing 12 is also secured to the driving and driven components and provides the guide for the core 10. The particular end constructions, however, do not form any part of the subject invention and accordingly are not shown.

Figure 4:
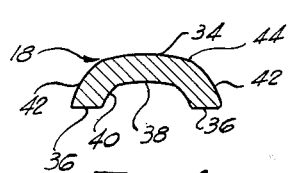
FIGS. 3, 4 and 5 are transverse sectional views of the respective wire members used to form the subject flexible casing.
Figure 3:
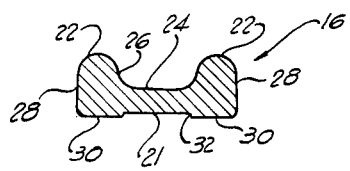
Figure 5:
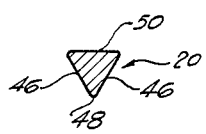

The casing 12 itself includes three separate wire members 16, 18 and 20 wound to concentric helixes having a common longtiudinal center axis disposed within the bore 14 and generally coincidental of the longitudinal center axis of the core 10 therein. Two of the wire members 16 and 18 are generally C-shaped in transverse cross-section and are shown in FIGS. 3 and 4 respectively. The third wire member 20 is wedge shaped in transverse cross-section and is shown in FIG. 5.

The inner wire 16 includes a web 21 interconnecting a pair of spaced transversed flanges 22 which define therebetween a generally concave channel 24. The contour of the channel 24 is generally smooth and continuous from the web around smooth fillets 26, convex free ends of the flanges 22 to opposing ends 28 and ultimately to a generally flat back side 30. The back 30 can be cut out as shown generally at 32, if desired, to form a spiral oil groove wound in the opposite spiral direction from the rotation of the core 10 therein. This causes a reverse pumping action of any fluid trapped within the casing bore upon rotation of the core therein.

The intermediate wire member 18 (FIG. 4) also includes a web portion 34 interconnecting spaced flanges 36 which define therein a concave channel 38. The channel 38 also is generally continuous and smooth, blending across arcuate fillets 40 to the free end of the flange 38. Opposing tapers 42 on the opposite ends of the member converge in a direction toward the web and blend smoothly with the back 44 of the member.

The outer wire member 20 (FIG. 5) is generally triangularly shaped, and includes wedge faces 46 diverging from apex 48 to a back wall 50 generally at an acute transverse angle relative to both the wedge faces 46.

Figure 2:
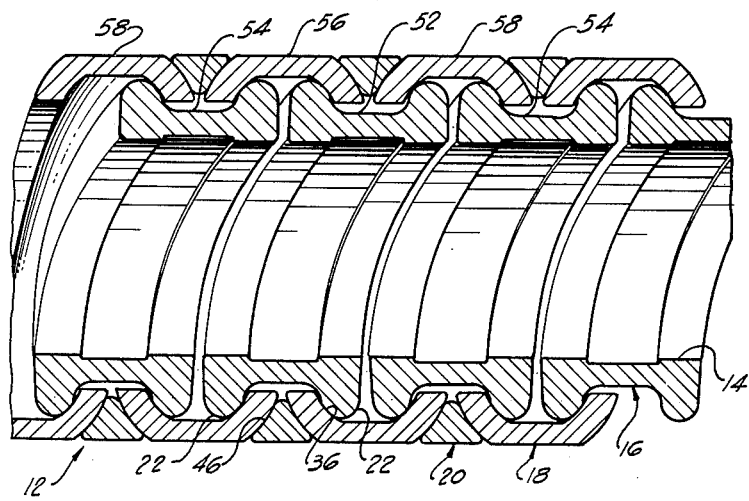
FIG. 2 is an enlarged sectional view of the subject flexible casing.

The wire members 16, 18 and 20 cooperate with one another as shown in FIGS. 1 and 2. In fabrication of the casing, the wire member 16 is initially wound to a helix having a given longitudinal center axis with the adjacent turns of the inner wire 16, representatively shown at 52 and 54, being generally proximate one another but preferably not in direct contact with one another. The back side 30 of the inner wire 16 defines the main portion of the bore 14 of the casing 12. The second intermediate wire 18 is wound with its C-shaped contour towards that of the inner member 16 and with its spaced flanges 36 overlapping the adjacent flanges 22 of the adjacent turn 52 and 54 of the inner member 16. Thus in combination the adjacent turns of the intermediate wire 18, shown representative at 56 and 58, overlap the adjacent flanges 22 of the adjacent turns 52 and 54 of the inner wire 16. The outer wire 20 is then wound between the spaced flanges 36 of the intermediate wire 18 with its wedge faces 46 in flush complementary engagement with the opposing tapers 42 of the intermediate member 18.

As shown in FIG. 2 when the casing is unflexed and its longitudinal center axis defines a straight line, preferably the adjacent turns of the C-shaped wire members 16 and 18 are spaced from each other. The wire members are held generally fixed relative to one another by means of their combined cooperation. The transverse portions of the flanges of the inner and intermediate members, 16 and 18 respectively, interlock one another to prevent axial extension of the casing. Similarly, axial compression of the casing is prevented by the already taut wire 20 which is wedged between the tapered wedge surfaces 42 of the intermediate wire 18. The wedging action of the members 16 and 18 on one another is opposed by the wedging action of of the members 18 and 20 on one another. Thus axial extension and compression of the casing are eliminated.

As shown in FIG. 1, however, transverse bending of the casing in a plane through the longitudinal center axis of the casing causes a shifting of the members relative to one another. Thus the adjacent turns of the members on the inner side of the casing approach one another while the adjacent turns on the outer side withdraw from one another. This is possible, it can be noted, by an inward or outward shifting of the intermediate casing wire 18 relative to the inner casing wire 16 and of the outer casing wire 20 relative to the intermediate casing wire. The relative shift on the outer side of the casing is counteracted by an opposite shift on the inner side of the casing. For example, upon transverse bending, the outer wire 20 shifts outwardly relative to its supporting intermediate member 18 on the inner side of the casing, while it shifts inwardly relative to the same member on the outer side of the casing. This shifting of the casing members relative to one another also maintains the center axis arc length of the casing constant independently of bending of the casing.

The various sections of the wires engaging one another, namely the transverse contours of the intermediate wire 18 on the inner wire 16 and the transverse contours of the outer wire 20 on the intermediate wire, all being arcuate freely permit transverse bending with a minimum of resistance. However, upon reaching the condition generally similar to that shown in FIG. 1, any continued bending is vigorously resisted by the strength of the particularly interlocked members. Ultimately, however, if bending is continued the members will fracture or become permanently disengaged. Undetected core kinking is thus prevented positively: first by the use of the interlocking casing of greater minimum curvature, and secondly by complete fracture of the casing upon exceeding the allowable limit so that replacement of the complete assembly is necessary.

In accordance with the preferred method of fabrication of the subject casing, it is desirable that the inner wire 16 be the hardest, the intermediate wire 18 be next hardest, and the outer wire 20 be the softest. Accordingly, winding of the intermediate wire 18 on the inner wire 16 acts in effect as winding over a tool member so that the softer intermediate wire deforms slightly to complement more truly the arcuate contour of the inner wire 16. Similarly, the outer wire 20, being softer than the intermediate wire 18, deforms slightly to form a truer complementary contact with its receiving tapers of the intermediate wire 18. The full flush engagements of the various members on one another adequately provide a fluid-tight casing to prevent fluid leakage and/or ingress of dirt.

The subject casing can thus be economically fabricated, particularly since the casing has a minimum of required tolerance conditions. However, inherently upon winding, the casing members have a true ball and socket action with one another, while interlocking with one another at a given radius of curvature to prevent further bending to any lesser radius of curvature. The minimum radius of curvature at which the casing will bind can be increased or decreased by decreasing or increasing, respectively, the spacing between the adjacent turns of the members so that the members bind on one another at different degrees of transverse bending.

While a single embodiment has been shown, various other modifications will be apparent to those skilled in the art. Accordingly, it is desired that the invention be limited only by the limitations contained in the claims hereinafter following.

What is claimed is:

1. A flexible casing, comprising first and second elongated members each generally C-shaped in transverse cross-section and each including a web interconnecting a pair of spaced transverse flanges that define therebetween a concave channel, said first and second elongated members being wound in overlapping relationship facing one another to concentric helixes with the adjacent flanges of adjacent separate turns of the first member being received within the channel of the overlapping second member and with the adjacent flanges of adjacent separate turns of the second member being received within the channel of the overlapping first member, at least the outer member having endward tapers on its flanges converging slightly in a direction away from the free ends of the flanges toward the web, a third elongated member of generally wedged contour being wound between the spaced flanges of the outer member in flush contact with the tapers thereof and defining a helix concentric of the other helixes, and the backside of the inner member defining a bore for the casing.

2. For use in a flexible shaft assembly, a protective flexible outer casing comprising in combination a pair of continuous wire members each generally C-shaped in transverse cross-section and each including a web and a pair of spaced flanges extending transversely of the web and defining therebetween a channel, contours on each of the members continuous and arcuate from the web around to the convex free ends of the flanges, the members formed to substantially concentric helixes staggered to overlap one another and presenting the C-shapes toward one another so that the arcuate contours of the flanges of the overlapping members abut and complement one another, at least the flanges of the outer member having opposing tapers converging in the direction away from the free ends thereof toward the web, a third member generally wedge-shaped in cross-section wound to a helix directly abutting the tapers, and the back side of the inner member defining the bore of the casing.

3. A flexible casing, comprising first and second elongated wire members each generally C-shaped in transverse cross-section and each including a web interconnecting spaced transverse flanges defining therebetween a concave channel, said first and second wire members being wound to concentric helixes in overlapping relationship with respect to one another and with the adjacent flanges of adjacent separate turns of the first member being received within the channel of the second overlapping member and with the adjacent flanges of adjacent separate turns of the second member being received within the channel of the overlapping first member, the flanges of the first and second members engaging one another and causing a wedging action between themselves effective radially of the casing, at least one of the two members having slightly opposing tapers converging in a direction radially of the center axis of the casing, and a third elongated wire member generally wedge-shaped in transverse cross-section wound between the spaced tapers of said one member in flush abutting contact therewith, said third member and said one member causing a wedging action between themselves radially of the casing, and the back side of the inner member defining a bore for the casing.

4. A flexible casing, comprising first and second elongated wire members each generally C-shaped in transverse cross-section and each including a web interconnecting spaced transverse flanges defining therebetween a concave channel, said first and second wire members being wound to concentric helixes in overlapping relationship with respect to one another and with the adjacent flanges of adjacent separate turns of the first member being received within the channel of the second overlapping member and with the adjacent flanges of adjacent separate turns of the second member being received within the channel of the overlapping first member, the flanges of the first and second members engaging one another and causing a wedging action between themselves effective radially of the casing, at least one of the two members having slightly opposing tapers converging in a direction radially of the center axis of the casing, and a third elongated wire member generally wedge shaped in transverse cross-section wound between the spaced tapers of said one member in flush abutting contact therewith, said third member and said one member causing a wedging action between themselves radially of the casing, the adjacent turns of both the first and second members being spaced from one another when the casing is unflexed and defining a straight line while the adjacent turns of either C-shaped member being adapted to abut when the casing is flexed to some minimum radius of curvature, and the back side of the inner member defining a bore for the casing.

5. A flexible casing, comprising first and second elongated continuous wire members each generally C-shaped in transverse cross-section and including a web and a pair of spaced flanges, said first and second elongated members being wound to concentric helixes in facing overlapping relationship with the adjacent turns of the first and second members being spaced from one another when the longitudinal center axis of the casing defines a straight line, said first and second members abutting one another on complementary contours extended transversely of the web between the web and the free ends of the respective flanges to limit separation of the adjacent turns of the members axially of the longitudinal center axis of the casing, a third elongated continuous wire member wedged between the adjacent turns of one of the members and defining a helix concentric with the previously-mentioned helixes, said third member being operable to ride radially in and out of the casing relative to its one supporting member upon flexure of the casing in a plane through the longitudinal center axis of the casing to permit the adjacent turns of either C-shaped member to abut to restrict further transverse flexure of the casing, and the back side of the inner member defining the bore of the casing.

6. A flexible casing, comprising first and second elongated continuous wire members each generally C-shaped in transverse cross-section and each including a web and a pair of spaced flanges, said first and second elongated members being wound to concentric helixes in facing overlapping relationship with the adjacent turns of the first and second members being spaced from one another when the longitudinal center axis of the casing is straight, said first and second members abutting one another on complementary arcuate contours extended transversely of the web between the web and the free ends of the respective flanges effective to create a wedging action between the members radially of the casing and to limit separation of the adjacent turns of the members axially of the casing, a third elongated continuous wire member of wedged shape wound between the adjacent turns of one of the members effective to create a wedging action between the members radially of the casing and defining a helix concentric with the previously-mentioned helixes, said first, second and third members each being operable to ride radially in and out of the casing relative to its supporting member upon flexure of the casing in a plane through the longitudinal center axis of the casing to permit the adjacent turns of either C-shaped member to abut to restrict further transverse flexure of the casing, and the back side of the inner member defining the bore of the casing.

7. A flexible casing according to claim 6, wherein the directions of taper of the third member are generally similar to the directions of taper of the complementary transverse contours of its one supporting member.

8. A flexible casing according to claim 6, wherein the abutting contours of the C-shaped first and second members diverge in the direction away from its respective web, and wherein the tapers of the third wedged shaped member diverge in the radial direction away from the center axis of the casing.

9. For use in a flexible shaft assembly, a protective outer casing comprising in combination three continuous wire members formed to substantially concentric helixes staggered to overlap one another, the inner and intermediate members each being generally C-shaped in transverse cross-section and each including a web and a pair of spaced convex flanges extended transverse of the web, the C-shaped contours being disposed to face one another so that the flanges of the members abut one another on the concave sides but are separated from one another on the endward convex sides when the casing is straight and unflexed, at least the intermediate member also having opposing end tapers blending smoothly with the convex flanges and converging slightly in the direction radially from the center axis of the casing, the outer member being generally wedge shaped in transverse cross-section and abutting the tapers of the intermediate member, the adjacent turns of said inner member being adapted to abut one another at the inner side of the casing upon flexure of the casing to a given radius of curvature to prevent continued bending to a smaller radius, and the back side of the inner member forming the bore of the casing.

10. A protective casing according to claim 9, wherein the inner wire member is the hardest of the three members, the outer wire member is the softest of the three members, and the intermediate wire member being of intermediate hardness compared to the inner and outer members.

References Cited in the file of this patent

UNITED STATES PATENTS

| | | |
|---|---|---|
| 973,238 | Tildeman | Oct. 18, 1910 |
| 1,053,394 | Hubbell | Feb. 18, 1913 |
| 1,637,141 | Cooper | July 26, 1927 |
| 3,085,406 | Hanebuth | Apr. 16, 1963 |